July 23, 1968 T. A. BUCHHOLD 3,394,335
THIN WIRE POWER CRYOTRONS
Filed Feb. 13, 1967 2 Sheets-Sheet 1
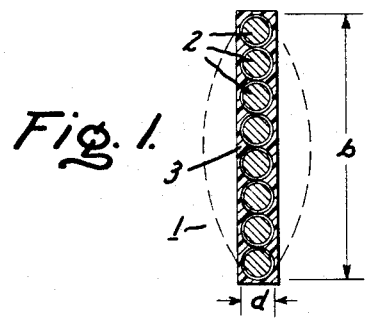
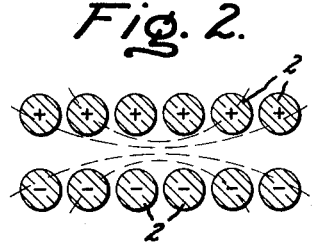
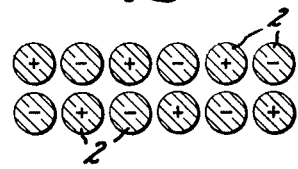
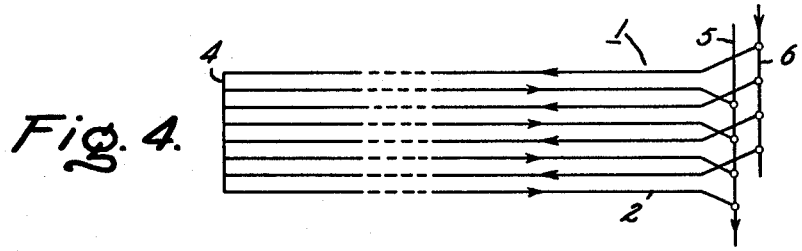
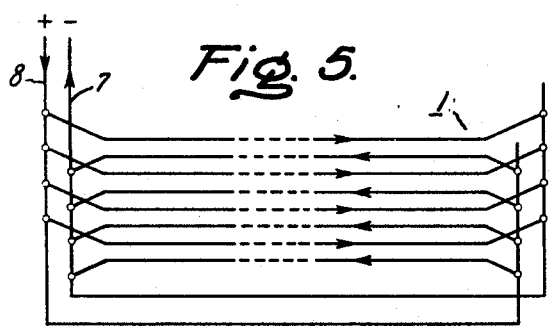
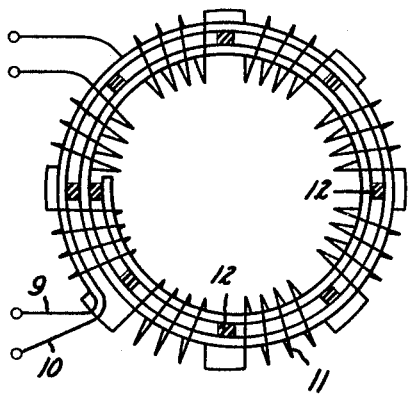
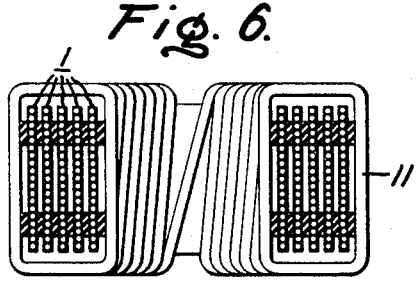
Inventor:
Theodor A. Buchhold,
by Anowien Mitchell
His Attorney.

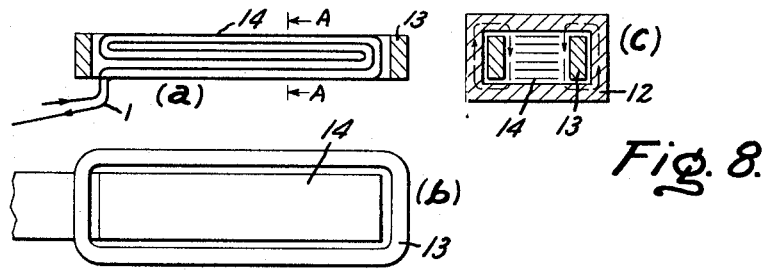
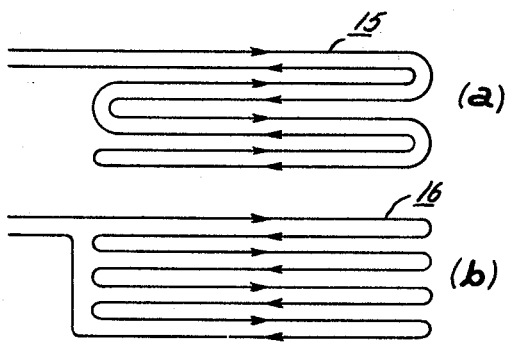
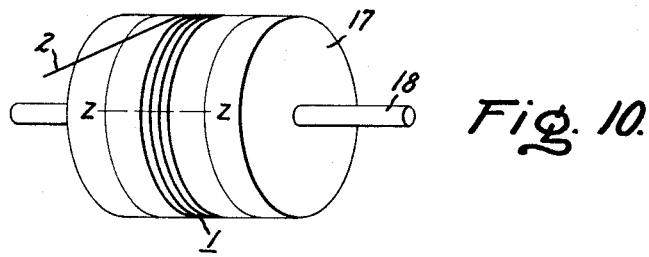
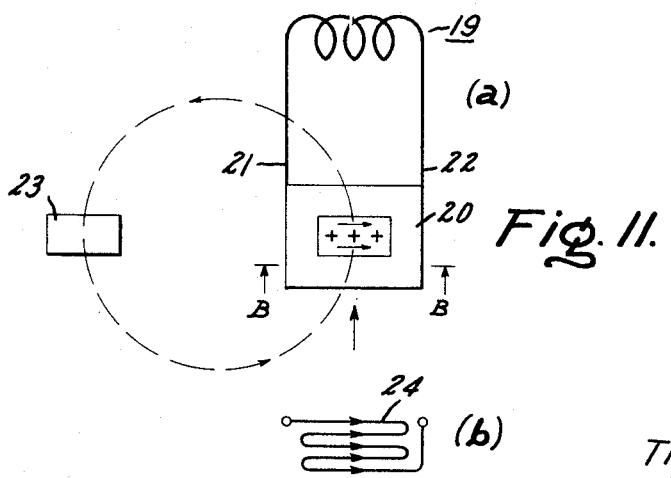
Fig. 8.
Fig. 9.
Fig. 10.
Fig. 11.
Inventor:
Theodor A. Buchhold,
by American Mitchell
His Attorney.

3,394,335
THIN WIRE POWER CRYOTRONS
Theodor A. Buchhold, Schenectady, N.Y., assignor to General Electric Company, a corporation of New York
Continuation-in-part of application Ser. No. 354,057, Mar. 23, 1964. This application Feb. 13, 1967, Ser. No. 616,754
9 Claims. (Cl. 338—32)

ABSTRACT OF THE DISCLOSURE

A thin wire power cryotron having a plurality of electrically insulated layers. Each layer comprises rows of insulated wires made of a superconducting material which has a first critical magnetic field strength, alternate wires having current going in opposite directions. The wires are interconnected to form a continuous relatively long superconducting path, and a control winding of second superconducting material has a second critical magnetic field strength greater than the first magnetic field strength and is wound around the layers of the first superconducting material so that these windings may be used to control the resistivity of the cryotron.

My invention relates to a thin wire power cryotron and, more particularly, my invention relates to a cryotron device which is capable of carrying and switching large currents at superconducting temperatures. This application is a continuation-in-part of my copending application S.N. 354,057, filed Mar. 23, 1964, now Patent No. 3,310,767, and assigned to the assignee hereof.

A power cryotron is a device of such a nature that while operating at cryogenic temperatures it can be switched from a superconducting condition to a non-superconducting or resistive condition by the application of an external magnetic field. Devices of this type which control small amounts of current are well known in the art and generally comprise a wire fabricated from a first superconducting material such as tin which has a relatively low critical magnetic field strength and which is surrounded by a field winding for producing the external switching magnetic field. The field winding must stay superconductive at all times while the wire must be of a material which will switch from superconductive to the resistive state. In the operation of a cryotron device the wire and coil are cooled to a temperature at which the wire is superconducting. At this temperature the wire offers virtually no resistance to current if the magnetic field surrounding the wire is small. If current is passed through a coil surrounding the wire, a magnetic flux will be built up and if the current in the coil is sufficiently increased a point, called the critical point, will be reached where the cold wire will become resistive without a change of temperature. For a more detailed description of the construction and operation of cryotrons, reference is made to the textbook entitled, "Superconductive Devices," by John W. Bremer, published by the McGraw-Hill Book Company, Inc., 1962.

The cryotron devices heretofore available in the art have all been designed for use with data handling and computer equipment, and operated in the milliampere region. The parallel wire power cryotron which is the subject of the present invention is intended for use with currents of hundreds and even thousands of amperes.

It is a primary object of my invention to provide a parallel wire tape power cryotron device capable, in a superconductive state, of carrying large superconducting currents in the order of hundreds or thousands of amperes, and which in the nonsuperconductive state has a large resistance.

It is another object of my invention to maintain a maximum flow of current in the superconductive portion and to change from the superconducting state to the resistive state by use of as low a magnetic field as possible considering the materials being used.

A further object of my invention is to reduce losses from sources such as eddy currents, hysteresis losses, flux trapping, flux jumping and to reduce the effect of a spread of local heating spots.

Briefly, my power cryotron has parallel wire structure which includes a relatively wide composite layer of insulated wires which is composed of two or more relatively wide layers of thin insulated wires making a first superconducting element having a first critical magnetic field strength point. These layers are spaced apart a small distance and are electrically insulated from each other. That is, each wire is electrically insulated from each other wire except at the ends where they may be connected in a way to cause current to flow in one direction or another. The current may flow in the same direction or in opposite directions in alternate wires depending on circuit connections and the effect desired.

In one embodiment a bifilar composite tape is rolled in the form of a coil, and a control winding of a second superconducting material having a second critical magnetic field strength greater than the first critical magnetic field strength surrounds the windings of a composite coil. A second preferred embodiment uses a bifilar thin wire composite superconducting tape which is folded in layers inside of a rectangular field producing coil.

Other objects, features and many of the attendant advantages of this invention will be appreciated more readily as the same becomes better understood by reference to the following detailed description, when considered in connection with the accompanying drawings.

FIGURE 1 is a cross-sectional view of a relatively flat superconducting tape made of insulated wires and which can be used in fabricating a power cryotron.

FIGURE 2 shows an interleaved bifilar tape with wires carrying current in opposing directions.

FIGURE 3 shows an interleaved bifilar tape in which the current runs in opposite directions in alternate wires.

FIGURE 4 shows a bifilar tape having its ends connected in series at one end to a current source.

FIGURE 5 shows a tape in which the wire ends are alternately connected in parallel to a power source.

FIGURE 6 shows a cross-sectional view of a toroidal power cryotron.

FIGURE 7 is a schematic view of the power cryotron shown in FIGURE 6 and illustrates the manner of its construction.

FIGURE 8a shows a bifilar winding within a magnetic coil.

FIGURE 8b shows a top view of the bifilar winding and coil.

FIGURE 8c shows a cross-sectional view of FIGURE 8a taken along the line A—A with a yolk shown about the windings.

FIGURE 9a shows one way of folding a thin wire tape.

FIGURE 9b shows another way of folding a thin wire tape.

FIGURE 10 shows a cylinder for fabricating a tape made of a plurality of parallel insulated wires.

FIGURE 11a shows a flux pump and,

FIGURE 11b shows a bottom view of the flux pump of FIGURE 11a taken along the lines B—B.

The showing of FIGURE 1 is a cross-sectional view of a relatively wide flat superconducting tape 1 made of a single layer of thin insulated wires 2 held together by a resin 3. For a power cryotron to be efficient the following requirements should be fulfilled. First, in its resistive state the resistivity should be high. Second, the resistive state should be obtainable with a magnetic field as low as possible. Third, after changing from the resistive to the superconductive state the cryotron should be able to carry large currents without subsiding and lastly, the inductance of the cryotron should be small. The provision of small wires 2 as shown in FIGURE 1 allows these requirements to be effected. Essentially, the superconducting tape shown in FIGURE 1 is a flat wire or tape which has been broken into many small wires so that breakdown of superconductivity at some isolated point in this thin wire tape will not necessarily affect the condition of any other wire in the thin wire tape. Also, eddy currents will be substantially nonexistent in a thin wire tape and losses from eddy currents and hysteresis will be very small and inductance will be small. It is clear that if some point in the tape loses its superconductivity due to say, heating, the other wires of the tape will be relatively unaffected by the resistance in one wire and there will not be a spread of an isolated hot spot. Similarly, the effects of flux trapping and flux jumping will be considerably reduced because any effects in these wires will be local. If thin wire tapes which are bonded together create a magnetic field, this magnetic field will be concentrated toward the center of the tapes and the lines of flux will curl about and will tend to cause the end wires of the tape to lie in a magnetic field as shown in FIGURE 2. Beacuse of the different flux linkage between the different thin wire elements, a greater current will flow in the outside wires than in the inside wires, thus the outside wires will tend to become resistive before the inner wires. However, because these wires are insulated from each other the effect of resistivity will be localized rather than general as might happen in the case of a solid superconductive tape. Further, because reduction of current flow in an outer wire will alter the shape of the magnetic field, the magnetic field about the resistive tape will be lower and the wire may become superconductive again i.e., resistivity due to flux from the magnetic field may be self-correcting.

By alternating the direction of current in the wires the end effect is substantially reduced. In FIGURE 3 the + sign indicates current passing in one direction while the − sign indicates current passing in the other direction. Since the wires are in juxtaposition the field of each wire will tend to cancel out the field of the adjacent wire. Since flux cancellation will cause a low magnetic field a bifilar tape with currents as shown in FIGURE 3 will allow greater current to flow since the magnetic cancellation is local and the total magnetic field strength will be less than in the case shown in FIGURE 2.

FIGURE 4 shows one method of obtaining a composite thin wire interleave tape 1 in which the currents in alternate wires 2 flow in opposite directions by bonding the wires of a normal composite tape together at one end 4 and making a bifilar cryotron tape. At the other end, the wires are alternately welded to one of two terminals 5, 6. If this tape is then folded, the current distribution shown in FIGURE 3 will be obtained.

Another way of achieving low flux is shown in FIGURE 5. The wires of a normal tape are fastened alternately to one pole 7 or the other 8 of a current source. The embodiment of FIGURE 5 is designed to give greater current for a given tape length while that of FIGURE 4 will result in a greater voltage drop because of the doubled length of the current path and may be used for higher voltages.

A composite superconducting tape structure similar to that shown in FIGURES 2, 3, 4, and 5 of the drawings may be rolled into the form of an annular coil shown in FIGURES 6 and 7 of the drawings.

In FIGURE 7 the conductors 9 and 10 represent the relatively wide and flat tapes of FIGURES 4 and 5 and when thus coiled have only a small inductance. The control winding in FIGURES 6 and 7 of the drawings is helically wound around the coiled composite superconducting tape structure in the manner shown. Control winding 11 is fabricated from a superconducting material having a critical magnetic field strength which is greater than the critical magnetic field strength of the composite superconducting tape 9 and 10. The critical magnetic field strength is defined as the minimum external magnetic field required to change a superconductor such as lead or niobium from its superconducting condition to ies normally conducting or resistive condition. It has been discovered that condition switching can be achieved by raising the temperature of the superconductive material or by varying an externally applied magnetic field to which the superconductor is exposed. For speed of operation, a magnetic field is applied to a superconductor having this property since it is easier to vary the strength of a magnetic field than it is to rapidly vary the temperature of a superconductor. The variation of the magnetic field is achieved by supplying a control or switching current $I_c$ to the input terminals of the field windings illustrated. The turns of the coil composite tape may be spaced apart by suitable insulating spacers 12 shown in FIGURE 7 in order to provide access for refrigerants. Before placing the power cryotron of FIGURES 6 and 7 in operation, it is necessary to place the device in a suitable insulating housing and submerge it in a cryogenic fluid such as liquid helium thus reducing the temperature of the device to the cryogenic temperatures required for superconduction. Techniques for accomplishing this objective are described in the textbook "Superconducting Devices" previously mentioned. After the cryogenic temperature is established then an electric current $I_1$ is supplied to the composite conductor.

A preferred embodiment of my invention is shown in FIGURES 8a, 8b and 8c wherein a bifilar wound cryotron is shown. A tape 1 made of insulated thin wires is wound as shown in FIGURE 8a and placed in a rectangular coil. When actuated the coil provides a magnetic field of sufficient force to cause the bifilar wound composite tape to become resistive. When the current is sent through the coils of the tape, the magnetic flux will be shown in FIGURE 8c.

The cryotron of FIGURES 8a and 8b is assembled with a laminated iron yolk 12 about the windings (FIGURE 8c) having a central opening a little larger in length and width than the cryotron assembly and of depth or length such that during operation, the assembly lies within the core. Suitable insulating means are provided along the sides and at the end of the cryotron. An important function of core 12 is to provide a path of low magnetic reluctance around coil 13 from the bottom surface of body 14 to the top surface thereof.

The cryotron of FIGURE 8 is easily quenched because due to the concentration of the magnetic flux lines, a high magnetic field strength is produced as soon as coil 13 is energized.

Comparing the embodiment of FIGURE 8 to that of FIGURE 7, it is apparent that the embodiment of FIGURE 8 will quench more easily because the direction of the magnetic field of FIGURE 8c traverses the layers of wires causing the magnetic flux to concentrate between the wires and raise the magnetic field above the amount to be expected in the usual situation. This heightened magnetic field will cause the embodiment of FIGURE 8 to quench more rapidly than that of FIGURE 7. It is readily appreciated that the coil of FIGURE 8 may be rectangular, ring shaped or in any other desired form that may be most suitable to the use to which it is to be applied. The cryotron must be immersed in a cryogenic liquid bath to bring about sufficient low temperatures for operation. Spacers are placed between the layers of tape and at the windings so that in this power cryotron space is left to allow cryogenic liquids to contact the tapes and to contact the magnetic coil. Because of the manner in which the bifilar tape is wound as shown in FIGURE 8a, a substantial localized cancellation of magnetic field is effected similar to that shown in FIGURE 3 and explained in preceding sections.

The bifilar winding 15 is shown in FIGURE 9a and 16 of FIGURE 9b are folded in stacked relation in accordion fashion to form a laminated body and are electrical equivalents to each other and may be used for the bifilar tape winding 14 shown in FIGURE 8a.

The advantages of using parallel wires to form a tape rather than a single flat conductive element are that there will be less losses from sources such as eddy currents, hysteresis losses, flux trappings, flux jumping, heat loss and others. The parallel wire cryotron will operate more efficiently and reliably because of these advantages.

One way of fabricating the thin composite thin wire tape 1 used in the embodiments is to wind or feed an insulated thin wire 2 onto a rotating cylinder. The cylinder 17 shown in FIGURE 10 is mounted upon a spindle 18 and rotated slowly about the spindle axis. On the surface of the cylinder is a non-adhering material such as a Mylar (trademark of E. I. duPont de Nemours and Co.) sheath which rotates with the cylinder 17. The insulated thin wire is fed onto the cylinder as it rotates and after a suitable amount of wire has been wound upon the Mylar covered cylinder, a resin such as epoxy is applied to the wire and cylinder. At the area ZZ a space of bare wire is left so that electrical connections can be made to the tape. Once the epoxy has hardened, the wire may be cut along the lines ZZ and the wire and epoxy which now form a tape may be stripped from the Mylar sheath. Since epoxy does not adhere to Mylar, this is readily done and the superconducting composite tape is now fabricated.

An application of the wire cryotron to a particular flux pump 19 is shown in FIGURE 11 of the drawings. In this flux pump as shown in FIGURE 11a, a plate 20 of niobium or some other superconductive material is connected by terminals 21 and 22 to a superconductive coil. A permanent magnet 23 produces a strong magnetic flux which penetrates through the thin plate 20 and produces at some point in the thin plate a resistive area. It can be shown that if the magnet is moved along the dashed line, the voltage and an increasing coil current is produced. The moving flux produces a net current through the coil. However, the moving flux produces in the resistive area of the sheet considerable eddy current and hysteresis losses which losses will be reduced if the sheet is replaced by parallel wires which are folded in accordion fashion as shown in FIGURE 11b to form element 24. The moving flux produces electromotive forces indicated by the arrows. These forces will cancel in the four lower folds but a remaining electromotive force will exist in the upper fold and its net effect will be the same as that produced in the sheath. Because the current path is broken up into many small wires and is longer, the losses are much reduced because the same E.M.F. exists but a longer length of wire produces larger resistance with the same E.M.F. as in the device of FIGURE 11a. The principle as described above can be applied to other flux pumps and other machinery devices.

It is to be appreciated that the tape could be fabricated from a series of strips or other shaped wires rather than conventional round ones and such conductors are within the scope of my invention.

The foregoing is a description of an illustrative embodiment of the invention, and it is applicant's intention in the appended claims to cover all forms which fall within the scope of the invention.

What I claim as new and desire to secure by Letters Patent of the United States is:

1. A power cryotron including in combination a relatively wide tape made of thin insulated wires of a first superconducting material lying adjacent to each other with their axes along the length of the tape, and
   a control winding of a second superconducting material having a second critical magnetic field strength which is greater than the first critical magnetic field strength surrounding and spaced apart in electrically insulating relation to the first superconducting tape so as to control the resistance of said tape.

2. The combination set forth in claim 1 wherein said insulated wires of said tape are wound in a bifilar manner so that the current in adjacent wires runs in opposing directions.

3. The combination set forth in claim 2 wherein said tape of first superconducting material having a first critical magnetic field strength is wound in the form of an annular coil, a control winding of second superconducting material having a second critical magnetic strength greater than the first critical magnetic field strength and spaced apart in electrically insulating relation to the annularly coiled first superconducting tape, the control winding being helically wound around the annularly coiled first superconducting tape with the turns of the helically wound control winding being left open at spaced apart intervals around the periphery of the annularly coiled first superconducting tape to provide access for refrigerant to the surfaces of the first superconducting tape.

4. The combination set forth in claim 3 wherein said annularly coiled tape has insulating blocks between the coils to space succeeding coils of said tape from each other.

5. The combination set forth in claim 2 wherein said bifilar tape is placed into said power cryotron so that said tape is at regularly progressing intervals doubled back upon itself without buckling and is folded accordion fashion, and
   said control winding is in the form of a frame of rectangular shape and designed so that the magnetic flux generated by said winding passes through said tape.

6. The combination set forth in claim 2 wherein said bifilar tape is doubled and at regularly progressing intervals is folded back upon itself so that the locally induced magnetic fields are substantially canceled and
   said control winding is of rectangular shape so that the magnetic flux generated by said winding will pass through said tape.

7. The combination set forth in claim 1 wherein said tape is arranged in a continuous stacked relation to provide a laminated body having top and bottom surfaces and end surfaces and having sides defined by the edges of said tape, and a superconducting control winding of second critical magnetic field strength greater than the first critical magnetic field strength, said control winding being in the form of a ring and enclosing only the sides and end surfaces of the laminated body to apply magnetic flux through said tape for switching said tape.

8. The combination set forth in claim 1 wherein said tape is folded into a laminated body comprising a plurality of electrically insulated layers of relatively fine wires extending in the direction of the superconductor tape and having a first critical magnetic field strength, and interconnected to form a continuous relatively long superconducting path and to provide continuous top and bottom surfaces and edge portions extending the length of the superconducting path, and
   said control element being in the form of a coil of height approximating the height of the laminated body and disposed to enclose the end surfaces and the sides of said body in closely spaced relation to said body sides and a body of iron disposed around and adjacent to the control coil and providing a path of low magnetic inductance around the control coil between the top and bottom surfaces of the laminated body.

9. The combination set forth in claim 1 wherein said tape is folded into a laminated body and interconnected to form a continuous relatively long superconducting path and to provide continuous top and bottom surfaces and edge portions extending the length of the superconducting path, and a superconducting control element being in the form of a ring and enclosing only the sides and end surfaces of the laminated body to apply to the said edge portions a magnetic flux for switching the said superconductor tape.

References Cited

UNITED STATES PATENTS

| | | | |
|---|---|---|---|
| 3,037,127 | 5/1962 | Logue et al. | 338—32 X |
| 3,336,549 | 8/1967 | Kafka et al. | 338—32 X |

DARRELL L. CLAY, *Primary Examiner.*

D. A. TONE, *Assistant Examiner.*